(12) United States Patent
Pedersen et al.

(10) Patent No.: US 9,832,658 B2
(45) Date of Patent: Nov. 28, 2017

(54) INTERFERENCE COORDINATION BY MEANS OF DIRECTIONAL ANTENNA BEAMS IN A WIRELESS SYSTEM

(75) Inventors: Klaus Ingemann Pedersen, Aalborg (DK); Beatriz Soret, Aalborg (DK); Jens Steiner, Klarup (DK)

(73) Assignee: Nokia Solutions and Networks Oy, Espoo (FI)

( * ) Notice: Subject to any disclaimer, the term of this patent is extended or adjusted under 35 U.S.C. 154(b) by 28 days.

(21) Appl. No.: 14/387,273

(22) PCT Filed: Mar. 23, 2012

(86) PCT No.: PCT/EP2012/055236
§ 371 (c)(1),
(2), (4) Date: Sep. 23, 2014

(87) PCT Pub. No.: WO2013/139400
PCT Pub. Date: Sep. 26, 2013

(65) Prior Publication Data
US 2015/0085771 A1    Mar. 26, 2015

(51) Int. Cl.
| | | |
|---|---|---|
| *H04W 4/00* | (2009.01) | |
| *H04W 16/28* | (2009.01) | |
| *H04W 72/08* | (2009.01) | |
| *H04W 24/02* | (2009.01) | |
| *H04W 88/08* | (2009.01) | |
| *H04W 72/04* | (2009.01) | |
| *H04W 84/04* | (2009.01) | |

(52) U.S. Cl.
CPC ............ *H04W 16/28* (2013.01); *H04W 24/02* (2013.01); *H04W 72/082* (2013.01); *H04W 88/08* (2013.01); *H04W 72/046* (2013.01); *H04W 72/0426* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 9,467,998 B2* | 10/2016 | Xiao ................. | H04W 72/0426 |
| 2010/0085917 A1* | 4/2010 | Gorokhov ............. | H04L 5/0023 370/328 |
| 2010/0322227 A1* | 12/2010 | Luo ........................ | H04B 7/024 370/345 |
| 2010/0323711 A1* | 12/2010 | Damnjanovic ....... | H04B 7/0617 455/450 |
| 2011/0098055 A1* | 4/2011 | Kwon ................... | H04W 52/08 455/452.2 |
| 2011/0306381 A1 | 12/2011 | Jia et al. ........................ | 455/522 |

(Continued)

FOREIGN PATENT DOCUMENTS

WO    WO 2010/064856 A2    6/2010

*Primary Examiner* — Michael J Moore, Jr.
(74) *Attorney, Agent, or Firm* — Harrington & Smith (57) ABSTRACT

The disclosure relate to interference coordination in wireless communications. A first level station can obtain information for interference coordination with a second level station to protect the second level station from interference in arrangement where the second level station provides a smaller coverage area than the first level station and is at least partially located in the area of the first level station. Use of directional antenna beams by the first level station and/or communications by the second level station can then be controlled accordingly.

20 Claims, 3 Drawing Sheets

Obtain information regarding interference by a 1st level station to a smaller 2nd level station for interference coordination between the stations — 40

Control directional antenna beams accordingly — 42

(56) References Cited

U.S. PATENT DOCUMENTS

| | | | |
|---|---|---|---|
| 2012/0142352 A1* | 6/2012 | Zhang | H04W 36/0072 455/436 |
| 2012/0258724 A1* | 10/2012 | Kim | H04W 72/082 455/452.2 |
| 2012/0329400 A1* | 12/2012 | Seo | H04J 11/005 455/63.1 |
| 2013/0017855 A1* | 1/2013 | Hui | H04W 16/28 455/522 |
| 2013/0044707 A1* | 2/2013 | Chen | H04W 72/1231 370/329 |
| 2013/0053077 A1* | 2/2013 | Barbieri | H04B 7/0626 455/509 |
| 2013/0115985 A1* | 5/2013 | Davydov | H04B 7/024 455/501 |
| 2013/0194950 A1* | 8/2013 | Haghighat | H04W 24/02 370/252 |
| 2013/0223258 A1* | 8/2013 | Seo | H04W 24/02 370/252 |
| 2013/0322322 A1* | 12/2013 | Redana | H04W 24/10 370/315 |
| 2014/0185523 A1* | 7/2014 | Davydov | H04W 52/34 370/328 |
| 2015/0208294 A1* | 7/2015 | Lee | H04W 48/16 455/435.1 |
| 2015/0263835 A1* | 9/2015 | Shattil | H04B 7/026 370/329 |

\* cited by examiner

INTERFERENCE COORDINATION BY MEANS OF DIRECTIONAL ANTENNA BEAMS IN A WIRELESS SYSTEM

This disclosure e application relates to wireless communications and more particularly to interference coordination in a wireless communication system.

A communication system can be seen as a facility that enables communication sessions between two or more nodes such as fixed or mobile communication devices, access points such as base stations, servers and so on. A communication system and compatible communicating devices typically operate in accordance with a given standard or specification which sets out what the various entities associated with the system are permitted to do and how that should be achieved. For example, the standards, specifications and related protocols can define the manner how and what communication devices shall communicate with the access points, how various aspects of the communications shall be implemented and how the devices shall be configured.

Signals can be carried on wired or wireless carriers. Examples of wireless systems include public land mobile networks (PLMN) such as cellular networks, satellite based communication systems and different wireless local networks, for example wireless local area networks (WLAN). Wireless systems can be divided into coverage areas referred to as cells. Different types of cells can provide different features. For example, cells can have different shapes, sizes, power levels and other characteristics.

A user can access the communication system by means of an appropriate communication device. A communication device of a user is often referred to as user equipment (UE) or terminal. A communication device is provided with an appropriate signal receiving and transmitting arrangement for enabling communications with other parties. Wireless systems enable mobility for users where a mobile device can communicate over an air interface with another communication device such as e.g. a base station and/or other user equipment.

Examples of mobile communication systems are those based on standards by the 3rd Generation Partnership Project (3GPP). A recent 3GPP development is often referred to as the long-term evolution (LTE) of the Universal Mobile Telecommunications System (UMTS) radio-access technology. The various development stages of the 3GPP LTE specifications are referred to as releases. In LTE base stations are commonly referred to as enhanced NodeBs (eNB). In LTE a node providing a relatively wide coverage area in public landline mobile network (PLMN) level is often referred to as a macro eNode B. Network nodes can also provide smaller service areas. Examples of such smaller or local radio service area network nodes include femto nodes such as Home eNBs (HeNB), pico nodes such as pico eNodeBs (pico-eNB), micro nodes and remote radio heads. A smaller radio service area can be located wholly or partially within one or more larger radio service areas. In some instances a combination of wide area network nodes and small area network nodes can be deployed using the same frequency carriers (e.g. co-channel deployment). Different radio technologies may be used at the same time in a multi-layered system. Multi-layered systems are often referred to as heterogeneous networks or HetNets. An example of a multi-layered system is a mixture of macro base stations and small power base stations (e.g. pico and/or micro stations). The various layers can be deployed as part of a cellular network. It is noted that a multi-layer LTE network is used herein only as an example and that other solutions are also possible.

Interference caused by the different stations affects performance. To address this coordination of interference between different radio service areas can be provided. A way to mitigate interference is to transmit at least some of the transmission elements with reduced or minimal energy so that reduced power and/or other interfering activity is caused by the transmission thereof. Macro to pico node interference can be addressed by resource partitioning between the macro and pico nodes such that some transmission resources for pico are free of macro cell interference. As an example, 3GPP Release includes so-called enhanced inter-cell interference coordination (eICIC) feature, where resource partitioning is implemented in the time-domain. The basic eICIC principle relies on reserving some transmission resources exclusively for pico by muting the macro. Thus, a so-called muting pattern is configured to provide time periods where one or more cells will not transmit, or the transmissions are kept in their minimum so as to ensure interference free periods for transmissions in one or more other cells. An example of muted subframes is an almost blank subframe (ABS). Similarly, resource partitioning between macro and pico nodes can also be implemented in the frequency domain by having some frequency resources used exclusive for pico (i.e. not subject to macro cell interference).

Although several techniques for interference mitigation based on multicell coordination have been proposed there may still be occasions where other solutions might be desired, in particular in addressing interference by macro nodes to smaller nodes. For example, a result of resource partitioning schemes is a reduced availability of transmission resources at the macro layer as it is not able to use the resources reserved exclusively for pico usage.

It is noted that the above discussed issues are not limited to any particular communication environment and station apparatus but may occur in any appropriate system where cells are selected by mobile devices.

Embodiments of the invention aim to address one or several of the above issues.

In accordance with an embodiment there is provided a method for interference coordination in wireless communications, comprising obtaining information by a first level station for interference coordination with a second level station to protect the second level station from interference by the first level station, the second level station providing a smaller coverage area than the first level station and being at least partially located in the area of the first level station, and controlling use of directional antenna beams by the first level station according to the information.

In accordance with an embodiment there is provided an apparatus for a first level station in a wireless system where at least a second level station is provided, the second level station providing a smaller coverage area than the first level station and being at least partially located in the area of the first level station, the apparatus comprising at least one processor, and at least one memory including computer program code, wherein the at least one memory and the computer program code are configured, with the at least one processor, to obtain information by the first level station for interference coordination with the second level station to protect the second level station from interference by the first level station, and to control use of directional antenna beams by the first level station according to the information.

In accordance with an embodiment the information can be obtained by means of at least one of receiving information from the second level station, using of a network listen mode, and monitoring common reference signals by the second level station.

In accordance with another embodiment there is provided a method for interference coordination in wireless communications, comprising sending and/or receiving information by a second level station for interference coordination by means of directional antenna beams by a first level station, the second level station providing a smaller coverage area than the first level station and being at least partially located in the area of the first level station, the information regarding interference by the first level station in the area of the second level station, and controlling communication by the second level station according to the information.

In accordance with an embodiment there is provided an apparatus for a second level station in a wireless system where at least a first level station is provided, the second level station providing a smaller coverage area than the first level station and being at least partially located in the area of the first level station, the apparatus comprising at least one processor, and at least one memory including computer program code, wherein the at least one memory and the computer program code are configured, with the at least one processor, to cause sending and/or receiving of information by the second level station for interference coordination by means of directional antenna beams by first level station, the information regarding interference by the first level station in the area of the second level station, and control communication by the second level station according to the information.

In accordance with a more detailed embodiment the information is signalled on an interface between the first and second level stations. The interface may comprise an X2 interface or an interface provided via a network system.

An active antenna system may be used by the first level station for providing the directional antenna beams. Control of directional antenna beams may comprise control of joint elevation and azimuth beamforming. Range of the second level station may be extended by means of the interference coordination.

The interference coordination can aim to avoid pointing antenna beams into the area of the second level station on resources defined in time and/or frequency domain.

The information for interference coordination may comprises at least one of information of the spatial area to be protected from interference, identity of a second level station to be protected from interference, information of resources desired to be protected from interference, information of resources that are protected, and information of level of protection desired by the second level station.

The first level station may comprise a macro level enhanced Node B and the second level station comprises a pico level, a micro level or a femto level node.

A computer program comprising program code means adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained with reference to a wireless or mobile communication system serving mobile communication devices. Before explaining in detail the exemplifying embodiments, certain general principles of wireless communications are briefly explained with reference to FIGS. 1 and 2 to assist in understanding the technology underlying the described examples.

A non-limiting example of the recent developments in communication system architectures is the long-term evolution (LTE) of the Universal Mobile Telecommunications System (UMTS) standardized by the 3rd Generation Partnership Project (3GPP). More recent development of the LTE, Release 10 and upwards, are sometimes referred to as LTE-Advanced. The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 1:
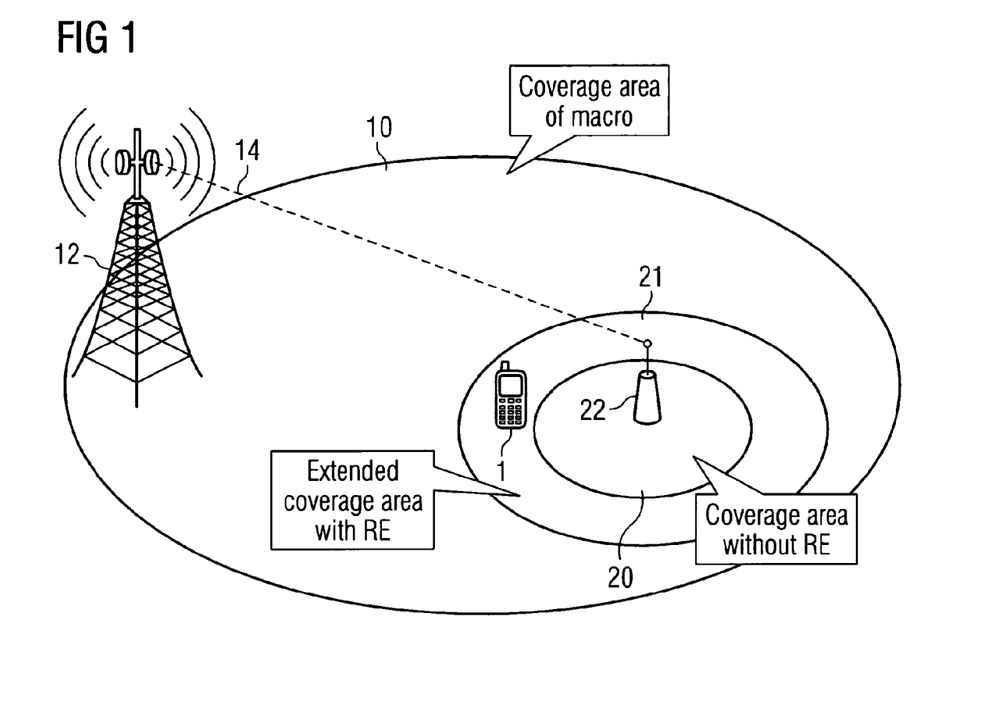
FIG. 1 shows a schematic diagram of a communication system where the invention may be embodied.

Mobile communication devices 1 can be provided with wireless access via base stations or similar wireless transmitter and/or receiver nodes providing radio service areas or cells. The base stations are typically connected to a wider communications network via appropriate gateways. FIG. 1 shows two radio service areas 10 and 20. The services areas or cells are provided by respective base station nodes 12 and 22. A mobile communication device 1 may be located in the service areas of different cells, communicate with more than one cell and be handed over from a cell to another. In particular, FIG. 1 depicts heterogeneous network comprising a macro cell 10 provided by wide area base station 12 and a smaller cell 20 provided by local base station 22. The small cell can be e.g. a pico-cell, a micro cell or a femto cell. In accordance with LTE-Advanced the transmission/reception points or base stations can comprise wide area network nodes 12 such as a macro eNode B (eNB) which may, for example, provide coverage for an entire macro cell or similar radio service area. The small or local radio service area network nodes may be provides for example by Home eNBs (HeNB), pico eNodeBs (pico-eNB), or femto nodes. Some applications may utilise radio remote heads (RRH) that are connected to for example an eNB.

Base station nodes are connected to a core communications network via appropriate gateways and/or backhaul systems. The smaller area stations can be connected to the core for example by a separate gateway/backhaul function and/or via the controllers of the macro level station. For example, user traffic from station 22 can be backhauled to a mobile core network over an Internet Protocol (IP) link provided e.g. by residential or office broadband connection available locally. Base station nodes 12 and 22 may communicate via each other via fixed line connection and/or air interface. The logical connection 14 between the base station nodes can be provided for example by an X2 interface.

It is noted that the number of cells and the cell borders are only schematically shown for illustration purposes in FIG. 1, and that these can vary considerably from that shown. It shall thus be understood that the size and shape of the cells may vary considerably from those shown in FIG. 1, and that in real life scenarios there are likely to be more than two cells.

Figure 2:
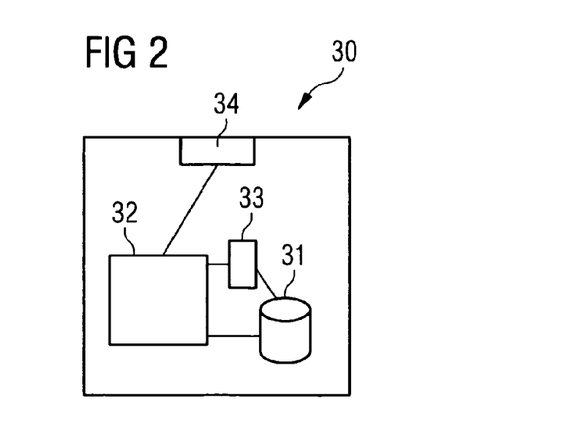
FIG. 2 shows a schematic diagram of a control apparatus according to some embodiments.

Base stations are typically controlled by at least one appropriate controller apparatus so as to enable operation thereof and management of mobile communication devices in communication with the base stations. The control apparatus can be interconnected with other control entities. FIG. 2 shows an example of a control apparatus capable of operating in accordance with the embodiments, for example to be coupled to and/or for controlling a base station. The control apparatus 30 can be arranged to provide control on communications in the service area of a cell. In some embodiments a base station can comprise a separate control apparatus. In other embodiments the control apparatus can be another network element. The control apparatus 30 can be configured to provide control functions in association with generation and communication of information of cells and/or control functions based on such information by means of the data processing facility in accordance with certain embodiments described below. For this purpose the control apparatus comprises at least one memory 31, at least one data processing unit 32, 33 and an input/output interface 34. The control apparatus can be coupled to a receiver and/or transmitter of the base station via the interface. The control apparatus can be configured to execute an appropriate software code to provide the control functions. The control apparatus and functions may be distributed between a plurality of control units. In some embodiments, each base station can comprise a control apparatus. In alternative embodiments, two or more base stations may share a control apparatus.

A possible mobile device 1 for communications with the base stations is often referred to as user equipment (UE) or terminal. An appropriate mobile device may be provided by any device capable of sending radio signals to and/or receiving radio signals from multiple cells. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile device may provide, for example, communication of data for carrying communications such as voice, electronic mail (email), text message, multimedia and so on. Users may thus be offered and provided numerous services via their devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information. The mobile device may receive and transmit signals over an air interface with multiple base stations via an appropriate transceiver apparatus.

A wireless communication device, such as a base station and/or a mobile station, can be provided with a Multiple Input/Multiple Output (MIMO) antenna system for enabling multi-flow communications. MIMO arrangements as such are known. MIMO systems use multiple antennas at the transmitter and receiver along with advanced digital signal processing to improve link quality and capacity. More data can be received and/or sent where there are more antenna elements.

Figure 3:
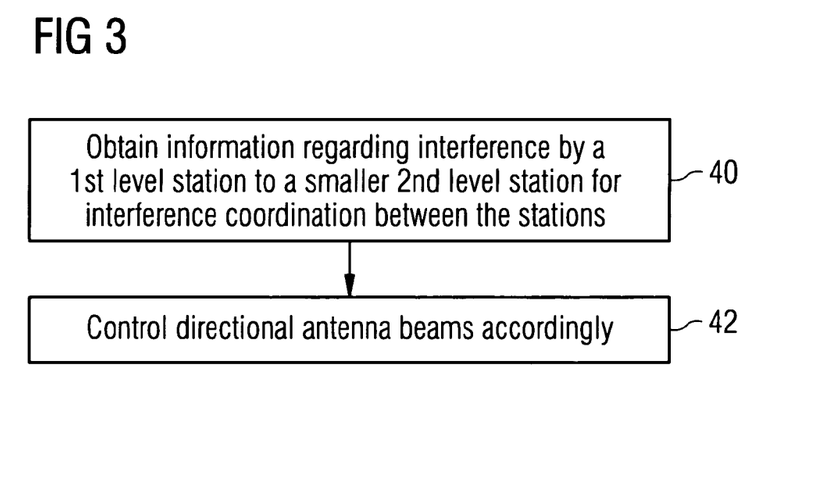
FIGS. 3 and 4 show flowcharts according to certain embodiments.

Interference coordination can be provided between the different layers in heterogeneous networks. In the herein described embodiments features of directional antenna beams are utilised to provide spatial resolution to protect lower level stations from interference. In accordance with an embodiment shown by the flowchart of FIG. 3 this can be provided by a method for interference coordination where information is obtained at 40 by a first level station for interference coordination with a second level station to protect the second level station from interference by the first level station. The second level station provides a smaller coverage area than the first level station and is at least partially located in the area of the first level station. Use of directional antenna beams by the first level station can then be controlled at 42 according to the information. The second level station may be informed of the control so that it becomes aware of resources where interference by the first level station is reduced.

The information can be obtained e.g. by receiving the information from the second level station, using a network listen mode, and/or monitoring common reference signals by the second level station.

Figure 4:
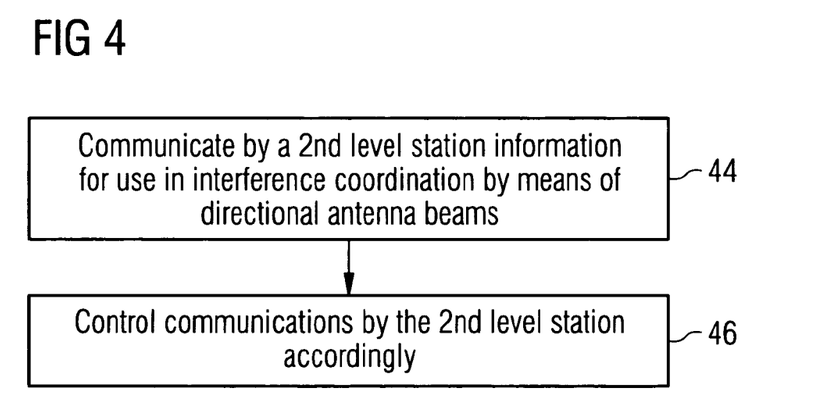

The option of receiving at least a part of the information from the second level station and/or sending information regarding the interference coordination to the second level station is shown in FIG. 4 where information is send and/or received by the second level station for interference coordination by means of directional antenna beams by a first level station at 44 and where communications by the second level station are controlled at 46 according to the information.

In accordance with a more detailed embodiment spatial interference coordination of antenna beams of a macro level base station (beam steering) is used for certain time and/or frequency resources. The spatial interference coordination may be used e.g. for LTE co-channel deployment of macro and small cells and downlink (DL) interference from macro to small cells. By controlling the downlink interference to small cells, more users can be offloaded from the macro layer, resulting in an overall network performance gain. The spatial interference coordination is used such that use of resources that can be used by a smaller base station to serve its users can be provided in a range extension area denoted by 21 in FIG. 1. To provide this certain parts of macro cells can be blanked out. More particularly, areas covered also by co-channel smaller cells can be blanked out by means of beamforming. During blanking out the relevant small cell may transmit whilst taking benefit from the lowered interference levels by the macro level station. This may be provided instead of excluding resources or reducing the transmission power on certain resources. The blanking out can be provided by means of inter-eNB signaling, control procedures, and management and/or coordination of transmissions in space domain.

FIG. 1 illustrates a simplified scenario as an example of a multi-layer network with macro and a small cell, for example a pico cell. It is noted that this example uses the term "pico" to denote small cells for simplicity, and that the same principles also apply for other cases e.g. where pico is substituted by a micro and/or femto level cell or in a system where different levels are employed.

Assuming an operating bandwidth of 10 MHz, a typical configuration of the macro base station (eNB) is 46 dBm transmit (Tx) power per sector, 14 dBi antenna gain (including feeder loss), which results in an equivalent isotropic radiated power (EIRP) of 60 dBm. The pico eNB can have, for example, an effective isotropic radiated power (EIRP) of 35 dBm, which results in significantly smaller coverage than the macro eNB.

The coverage area of a pico eNB is not only limited by its transmit power, but also to a large extent by interference experienced from a macro eNB. Thus, if a serving cell selection is based on downlink user equipment (UE) measurements such as reference symbol received power (RSRP) only UEs in the close vicinity will end up being served by the pico. The service area of the pico can be increased by applying a so-called range extension (RE), where a cell specific bias to the UE measurement of X dB is applied for a pico to favour connecting to it. However, in a traditional co-channel scenario without any explicit interference management, it is typically only possible to use small values of the RE, say few dBs, as pico UEs will otherwise experience too high interference from the macro layer.

The embodiments address interference from macro level to pico level nodes. Reduction in macro interference can be used to allow use of higher pico RE offsets to increase the offload from the macro-layer.

In accordance with an embodiment features of active antenna system (AAS) system and (e)ICIC are employed. According to a possibility shown in FIG. 5 coordinated spatial interference management from macro eNB 50 providing cell 52 to pico eNB providing cell 54 is used for cases where the macro eNBs are equipped with active antenna systems (AAS) supporting joint elevation and azimuth beamforming. The basic principle of AAS, as illustrated in FIG. 4, it that a macro-eNB 50 is able to form highly directional beams 56, 58 to only illuminate a relative small confined area in its cell.

Figure 5:
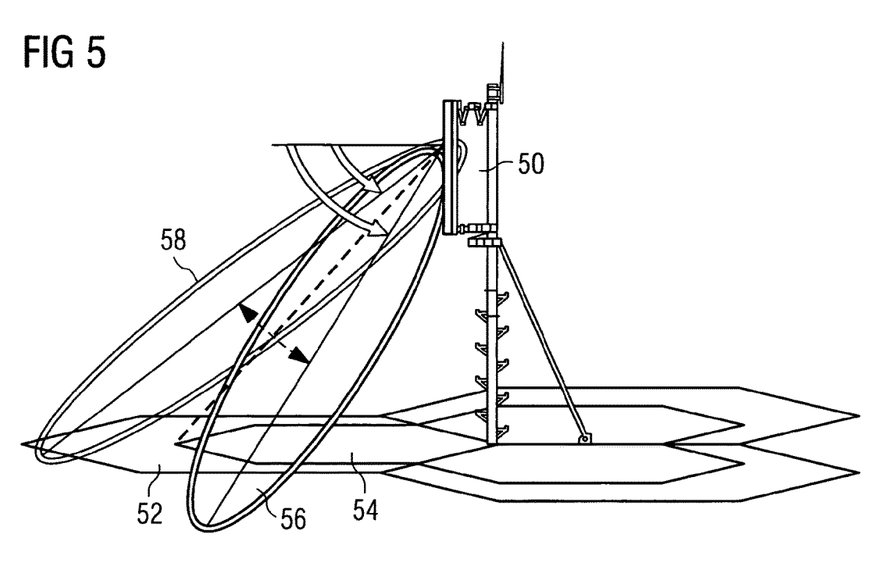
FIG. 5 shows an example of embodiment employing elevation and azimuth beamforming.

Given the assumption of macro sites with AAS, coordination between macro and pico can be provided such that macro avoids creating interference to the pico or other smaller station at certain resources. This can be avoided by not pointing the beams from the macro station 50 to the area covered by a smaller station. The resources where the macro avoids pointing beams in the direction of the smaller coverage area can be defined in the time-domain and/or frequency domain and are coordinated between macro and pico. At protected resources where no macro beam is pointed at the smaller coverage area the smaller node can serve users that it would otherwise not be able to serve due to too high macro-cell interference. Nevertheless, eNB 50 can serve other devices in the area 52 by means of the beam 58.

Relevant macro eNB(s) can be provided with knowledge of the approximate spatial area to be protected in its coverage area. In accordance with a possibility to get this information each macro eNB can obtain information on the spatial location of each pico cell by using network listen mode (NLM) and monitor the common reference signals (CRS) transmitted from the pico. By doing this, the macro eNB can estimate the azimuth-elevation of the pico-eNB via simple signal processing algorithms. A possible way of getting this information is that pico-eNB(s) provide explicit information to the macro-eNB over an interface such as the X2. The pico node(s) may inform the macro node which pico-UEs would benefit from being protected from macro cell interference. If such information is provided by the pico-eNB(s), the macro eNB can monitor the transmitted signals from the relevant pico-UEs and estimate the corresponding azimuth-elevation towards those.

Both of these methods can be applied simultaneously in a system. In this case a macro-eNB can get relative accurate estimation of the azimuth-elevation area covered by a smaller eNB. The estimate can become rougher if only part of the information is available.

Additional inter-eNB signaling can be introduced between macro and smaller nodes to facilitate coordination of resources where a certain smaller eNB is protected from interference by a macro eNB. The signalling can be provided e.g. via X2 interface. Inter-eNB signaling to facilitate such coordination can include cases where e.g. a pico eBN or another smaller node recommends certain resources to be protected from macro interference. Also, signaling where a macro eNB simply informs e.g. a pico node on which resource it can assume that there is reduced macro cell interference may be provided. A smaller eNB can also signal to a macro eNB whether it would benefit from having more resources protected from macro interference, or whether it could tolerate having less resources protected.

Inter-eNB signaling of "protected resources" with reduced macro cell interference can be expressed either in the frequency domain (e.g. as set of physical resource blocks (PRBs)), in the time-domain (e.g. on subframe resolution as for eICIC cases), or as a combination of time and frequency.

Inter-eNB signalling can be provided for example by introducing new X2 messages or by introducing new information elements (IEs) to existing messages. Instead of interface such as X2, the spatial interference coordination can also be implemented using information exchange via a centralized network unit such as operation and maintenance (OAM) element.

The proposed scheme can also be combined with the existing eICIC solution, or equivalent partial frequency domain partitioning schemes. As a further possibility, if position information, for example GPS information is available from the eNBs, such knowledge may also be utilized for estimating azimuth-elevation from a macro node in its coverage area.

Embodiments can be employed to avoid or at least reduce interference and to allow efficient use of time and/or frequency resources in macro and smaller eNBs. Range expansion of the small cell area(s) can be provided. Improved system capacity may be provided by use of adaptive antenna beam-forming to blank out certain parts of a cell instead of muting sub-frames in order to reduce inter-cell interference. When a macro node actively aims to avoid generation of interference for a smaller cell at certain resources, the smaller cell can serve users on those resources that would otherwise not be feasible due to too high macro-cell interference. While the macro avoids generating interference towards a certain smaller cell, it can still serve users that are spatially separated from that particular service area. Thus, the macro node may be able to transmit on all of its resources all the time.

It is noted that whilst embodiments have been described using LTE and LTE Advanced as examples, similar principles can be applied to any other communication system or indeed to further developments with LTE. Thus, instead of LTE, the invention may be applied to other cellular standards as well. Different layers may be implemented in different radio access technology (RAT), for example such that a GSM macro layer and LTE micro layer is provided. Also, instead of carriers provided by base stations at least one of the carriers may be provided by a communication device such as mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

This above embodiment can be provided as complementary to other interference coordination techniques, for example on those provided based on 3GPP standards e.g. in frequency and time domain.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method, comprising:
   obtaining information by a first level station for interference coordination with a second level station to protect the second level station from interference by the first level station, the second level station providing a smaller coverage area than a coverage area of the first level station and the smaller coverage area being at least partially located in the coverage area of the first level station; and
   controlling use of directional antenna beams by the first level station according to the information,
   wherein the information for interference coordination comprises at least one of:
   information of a spatial area defining the smaller coverage area of the second level station to be protected from interference,
   identity of the second level station to be protected from interference,
   and
   information of level of protection desired by the second level station.

2. A method according to claim 1, wherein the obtaining comprises at least one of receiving information from the second level station, using a network listen mode, and monitoring common reference signals from the second level station.

3. A method, comprising:
   sending and/or receiving information by a second level station for interference coordination by use of directional antenna beams at a first level station, the second level station providing a smaller coverage area than a coverage area of the first level station and the smaller coverage area being at least partially located in the coverage area of the first level station, the information regarding interference by the first level station in the area of the second level station; and
   controlling communication by the second level station according to the information,
   wherein the information for interference coordination comprises at least one of:
   information of a spatial area defining the smaller coverage area of the second level station to be protected from interference,
   identity of the second level station to be protected from interference,
   and
   information of level of protection desired by the second level station.

4. A method according to claim 3, comprising signalling the information on an interface between the first and second level stations.

5. A method according to claim 4, wherein the interface comprises an X2 interface or an interface provided via a network system.

6. A method according to claim 1, comprising use of an active antenna system in the first level station.

7. A method according to claim 1, wherein the use of directional antenna beams comprises control of joint elevation and azimuth beamforming.

8. A method according to claim 1, comprising extending a radio range of the second level station by means of the interference coordination.

9. A method according to claim 1, wherein the interference coordination comprises avoiding pointing beams into the smaller coverage area of the second level station on resources defined in time and/or frequency domain.

10. A method according to claim 1, wherein the first level station comprises a macro level enhanced Node B and the second level station comprises a pico level, a micro level or a femto level node.

11. An apparatus comprising:
   at least one processor, and
   at least one memory including computer program code, wherein the at least one memory and the computer program code are configured, with the at least one processor, to cause the apparatus at least to:
      obtain information for interference coordination with a second level station to protect the second level station from interference by a first level station, the second level station providing a smaller coverage area than a coverage area of the first level station and the smaller coverage area being at least partially located in the coverage area of the first level station, and
      control use of directional antenna beams by the first level station according to the information;
   wherein the information for interference coordination comprises at least one of:
      information of a spatial area defining the smaller coverage area of the second level station to be protected from interference,
      identity of the second level station to be protected from interference,
      and
      information of level of protection desired by the second level station.

12. An apparatus according to claim 11 wherein the obtain information comprises at least one of receive the information from the second level station, use a network listen mode, and monitor common reference signals from the second level station.

13. An apparatus comprising:
   at least one processor, and
   at least one memory including computer program code, wherein the at least one memory and the computer program code are configured, with the at least one processor, to cause the apparatus at least to:
      send and/or receive information for interference coordination by use of directional antenna beams at a first level station, a second level station providing a smaller coverage area than a coverage area of the first level station and the smaller coverage area being, at least partially located in the coverage area of the first level station, the information regarding interference by the first level station in the smaller coverage area of the second level station, and
      control communication according to the information;
   wherein the information for interference coordination comprises at least one of:
      information of a spatial area defining the smaller coverage area of the second level station to be protected from interference,
      identity of the second level station to be protected from interference,
      and
      information of level of protection desired by the second level station.

14. An apparatus according to claim 13, wherein the at least one memory and the computer program code are configured, with the at least one processor, to cause the apparatus at least to signal the information on an interface between the first and second level stations.

15. An apparatus according to claim 11, wherein the first level station comprises an active antenna system.

16. An apparatus according to claim 11, wherein control of directional antenna beams is based on joint elevation and azimuth beamforming.

17. An apparatus according to claim 11 comprises an enhanced Node B.

18. An apparatus according to claim 17, wherein the enhanced Node B comprising a macro node, a micro node, a femto node or a pico node.

19. A computer readable memory on which is stored computer program code adapted to cause a host apparatus to perform the steps of claim 1 when the computer program code is run on a processor of the host apparatus.

20. A computer readable memory on which is stored computer program code adapted to cause a host apparatus to perform the steps of claim 3 when the computer program code is run on a processor of the host apparatus.

* * * * *